US011822375B1

United States Patent
Bastian et al.

(10) Patent No.: US 11,822,375 B1
(45) Date of Patent: Nov. 21, 2023

(54) SYSTEMS AND METHODS FOR PARTIALLY SECURING DATA

(71) Applicant: Infosum Limited, Basingstoke (GB)

(72) Inventors: Alistair Joseph Bastian, Ash (GB); Jason Clifford Tye, Godalming (GB); Stephen Paul Rowles, Basingstoke (GB); Ashkan Lorkalantari, Birmingham (GB); Robert Graham Clayburn, Stroud (GB)

(73) Assignee: INFOSUM LIMITED, Basingstoke (GB)

( * ) Notice: Subject to any disclaimer, the term of this patent is extended or adjusted under 35 U.S.C. 154(b) by 0 days.

(21) Appl. No.: 18/140,852

(22) Filed: Apr. 28, 2023

(51) Int. Cl.
G06F 21/60 (2013.01)
G06F 21/62 (2013.01)

(52) U.S. Cl.
CPC ........ *G06F 21/602* (2013.01); *G06F 21/6218* (2013.01)

(58) Field of Classification Search
CPC .................... G06F 21/602; G06F 21/6218
See application file for complete search history.

(56) References Cited

U.S. PATENT DOCUMENTS

| 7,162,428 | B1 * | 1/2007 | Rosenthal | G06Q 99/00 705/300 |
| 10,409,802 | B2 * | 9/2019 | Spitz | G06F 16/2365 |
| 2009/0165098 | A1 * | 6/2009 | Ifrah | G06Q 20/02 705/317 |
| 2012/0137125 | A1 * | 5/2012 | Dhanda | H04W 12/02 713/153 |
| 2014/0359276 | A1 * | 12/2014 | Resch | H04L 63/061 713/153 |
| 2021/0143985 | A1 | 5/2021 | Mullin | |

* cited by examiner

*Primary Examiner* — Abiy Getachew
(74) *Attorney, Agent, or Firm* — BainwoodHuang

(57) ABSTRACT

A method at a controller (112) of a database network (110) is provided. The controller (112) receives (S100) a request for a first set of data entries (200*a*). The request comprises a public identifier and an identifier of a first database (111*a*) of the plurality of databases (111) from which the first set of data entries (200*a*) is to be retrieved, each data entry (210) in the first set of data entries (200*a*) comprising a respective raw value for each of a plurality of attributes (220). The controller (112) retrieves the first set of data entries (200*a*) and uses the public identifier to transform (S120) the raw values of at least a first attribute (220*a*) of the plurality of attributes (220) into respective synthetic values. The controller (112) generates (S130) and outputs (S140) a first dataset (300*a*) comprising data entries having the synthetic values for the first attribute (220*a*) and the raw values for at least one of the attributes (220).

14 Claims, 8 Drawing Sheets

400

410 420 430 440

| Database_ID | #Public_ID | Private_ID | Used_Flag |
|---|---|---|---|
| DB1 | 85243582 | 28553370 | FALSE |
| DB2 | 85243582 | 28553370 | FALSE |
| DB3 | 85243582 | 28553370 | FALSE |

| Database_ID | #Public_ID | Private_ID | Used_Flag |
|---|---|---|---|
| DB1 | 85243582 | 28553370 | FALSE |
| DB2 | 85243582 | 28553370 | TRUE |
| DB3 | 85243582 | 28553370 | FALSE |
| DB1 | 23058648 | 33957215 | TRUE |
| DB2 | 23058648 | 33957215 | FALSE |
| DB2 | 87442423 | 10058392 | FALSE |
| DB3 | 87442423 | 10058392 | FALSE |

Figure 7

SYSTEMS AND METHODS FOR PARTIALLY SECURING DATA

TECHNICAL FIELD

The present disclosure relates to systems and method for partially securing data.

BACKGROUND

Requesting data from one or more databases may take the form of a query. Queries are run on databases to find a match for the information being requested responsive to the query. For example, a user providing the query might want to know how many entries in a particular database satisfy a particular requirement, for example, an age range or gender requirement. There are numerous technologies available to handle this.

Nowadays every company holds valuable data, for example concerning attributes of consumers or potential consumers who may wish to access that data. Sharing customer data among different companies creates complex privacy issues relating to what information to share and not to share. It also creates complex security issues relating to how to prevent unauthorised access to information.

SUMMARY

According to a first aspect disclosed herein, there is provided a method at a controller of a database network, the database network comprising a plurality of databases storing data entries, the method comprising:
  receiving a request for a first set of data entries, the request comprising a public identifier and an identifier of a first database of the plurality of databases from which the first set of data entries is to be retrieved;
  retrieving the first set of data entries from the first database, each data entry in the first set of data entries comprising a respective raw value for each of a plurality of attributes;
  using the public identifier to transform the raw values of at least a first attribute of the plurality of attributes into respective synthetic values;
  generating a first dataset comprising data entries having the synthetic values for the first attribute and the raw values for at least one the attributes; and
  outputting the first dataset to at least one computing device external to the database network.

The request may or may not be provided by the same external computing device to which the first dataset is output.

In a first example of a particular advantageous use case, the first attribute is a key attribute and the second attribute is a non-key attribute.

In a second example of a particular advantageous use case, the first attribute is a non-key attribute and the second attribute is a non-key attribute.

In an example, using the public identifier to transform the raw values of the first attribute comprises combining the received public identifier with a private identifier to generate a salt value, and using the salt value to transform the raw values of the first attribute into respective synthetic values. This can prevent the requesting entity from being able to ascertain the raw values.

In an example, the method comprises shuffling data entries of the first dataset before outputting the first dataset to the computing device. This can prevent the requesting entity from being able to correlate two outputs by joining on row number.

In an example, the method comprises authenticating the received public identifier, and only using the public identifier to transform the raw values if the received public identifier is authenticated.

In an example, authenticating the received public identifier comprises determining that the public identifier was generated by the controller. In an example, determining that the public identifier was generated by the controller comprises accessing a computer memory storing hashes of public identifiers generated by the controller, hashing the received public identifier, and identifying a matching hash in the computer memory.

Alternatively or additionally, as discussed in more detail below, this can be implemented using a digital signature or message authentication code, or by the controller only generating public identifiers in a known format which can be later verified (e.g. by encrypting a known data blob).

In an example, authenticating the received public identifier comprises authenticating the received public identifier with respect to the first database identified in the request. In examples, authenticating the received public identifier comprises determining that the public identifier was generated by the controller for use with the first database.

In an example, authenticating the received public identifier with respect to the first database identified in the request comprises accessing a computer memory storing database identifiers in association with indications of public identifiers generated by the controller.

Alternatively or additionally, as discussed in more detail below, this can be implemented by verifying a signed payload, provided in the request, which was signed by the controller. This may also be implemented using an encrypted data blob, as described later below.

In an example, authenticating the received public identifier comprises determining that the public identifier has not previously been used to transform raw values for data entries in the database identified in the request more than a predetermined number of times.

In an example, determining that the public identifier has not previously been used to generate synthetic values for data entries in the first database comprises accessing a computer memory storing a respective flag associated with the first database and the public identifier, the flag indicating whether the public identifier has previously been used to generate synthetic values for data entries in the first database.

In an example, the method comprises, prior to receiving said request:
  receiving an input comprising an identifier of at least one of the plurality of databases;
  generating a public identifier in response to receiving the input;
  generating a data structure associating the received database identifier with an indication of the public identifier; and
  outputting the public identifier to at least one external computing device.

The input may or may not be received from the same external computing device to which the public identifier is output. Moreover, the input may or may not be received from the same external computing device that provides the request at the later point in time.

There are many examples regarding the particular form of the data structure, and several examples are described in detail herein. In some examples, the data structure may be stored locally at the controller (i.e. in a computer memory of the controller). In such cases, the controller may access the locally-stored data structure to perform one or more authentication steps as described herein. In other examples, the data structure may not be stored locally at the controller and may instead by output to the external computing device. In such cases, the external computing device provides the data structure along with the request for data output. The controller can then use the received data structure to perform one or more authentication steps as described herein.

In an example, the method comprises applying a hash algorithm to the public identifier to generate a hashed public identifier, wherein the indication of the public identifier associated in the data structure with the received at least one database identifier comprises the hashed public identifier and not the public identifier in raw form.

In an example, the data structure comprises a respective indicator for the received database identifier indicating how many times the public identifier has previously been used to generate synthetic values for data entries in the respective database.

In an example, the method comprises:
generating a private identifier in response to receiving the input; and
wherein the data structure further associates the private identifier with the received at least one database identifier and the indication of the public identifier.

In an example, the method comprises:
receiving a request for a second set of data entries, the request comprising the public identifier and an identifier of a second database of the plurality of databases from which the second set of data entries is to be retrieved;
retrieving the second set of data entries from the second database, each data entry in the second set of data entries comprising a respective raw value for each of a plurality of attributes including at least the first attribute;
using the public identifier to transform the raw values of at least the first attribute into respective synthetic values;
generating a second dataset comprising data entries having the synthetic values for the first attribute and the raw values for at least one of the attributes; and
outputting the second dataset to at least one computing device external to the database network.

The request for the second set of data entries may or may not be provided by the same external computing device to which the second dataset is output. Moreover, the external computing device to which the second dataset is output may or may not be the same external computing device to which the first dataset is output. In any event, because the same public identifier is used to generate the first and second datasets, the synthetic values comprised therein can be correlated (by any one or more of the external computing devices, provided they have access to the first and second datasets).

According to another aspect disclosed herein, there is provided a controller of a database network, the database network comprising a plurality of databases storing data entries, the controller being configured to perform the method of the first aspect or any example thereof.

According to another aspect disclosed herein, there is provided a computer program product comprising computer-executable instructions embodied on a computer-readable storage medium configured so as when executed by one or more processors to perform the method of the first aspect or any example thereof.

BRIEF DESCRIPTION OF DRAWINGS

To assist understanding of the present disclosure and to show how embodiments may be put into effect, reference is made by way of example to the accompanying drawings in which:

FIG. 6 shows schematically a first example data structure; and

FIG. 7 shows schematically a second example data structure.

DETAILED DESCRIPTION

Figure 1:
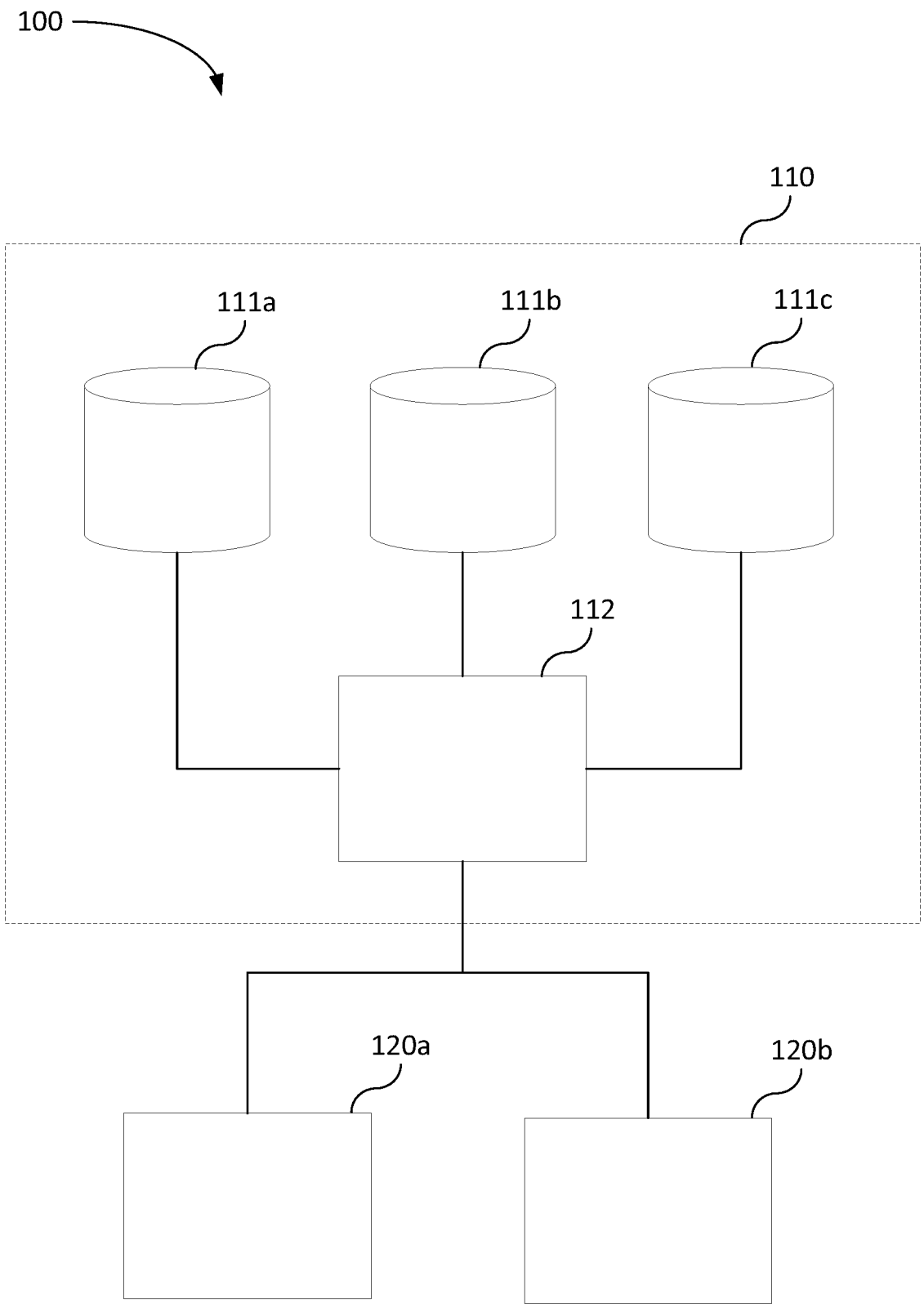
FIG. 1 shows schematically an example system comprising a database network and a computing device.

A database network storing data in a plurality of databases may output data to an external computing device in response to a request. In general, it may be desirable to perform analysis on the data output from the database network, may include correlating the data with other data (e.g., correlating salary data from one dataset with age data from another dataset by matching email addresses).

The decision of what data to output from the database network may concern data privacy. However, once it is decided to not output a particular set of data, then preventing unauthorized access to that set of data is a security concern. In other words, some data may be subject to security restrictions, i.e., only authorized parties may be permitted access to those data. The security-restricted data may be, e.g., email addresses, but may equally be non-identifying information such as salary or age data.

A technical problem therefore arises in how to allow analysis of data output from the database network while still ensuring security of the underlying raw data (i.e., while preventing unauthorized access to the underlying raw data).

The present disclosure solves this problem by recognising that only some attributes of the data may be subject to security restrictions. Before outputting the data from the database network, the security-restricted attribute(s) are cryptographically secured, while one or more other attributes of the data are left in their raw form. To continue the example above, each of the email addresses may be replaced with a secure version of the email addresses (e.g. an encrypted email address, or a hash of the email address), while the salary and age data may be left in raw form. In this sense, the output data may be considered "partially secured" or "partially encrypted".

As long as the manner in which the attributes are secured is consistent between two or more sets of partially secured data, then data analysis is still possible (the data can be still correlated). For example, if the attributes are secured using the same hash algorithm, then the data may be correlated by matching the hashes (to continue the example above, hashed email addresses may still allow the raw salary and age data to be correlated). A significant advantage of this is that the security of the data is ensured without completely taking away the ability to perform analysis on the data. That is, unauthorized access to the underlying information is prevented, whilst still allowing some aspects of the data to be analysed.

However, the present disclosure recognises that this process raises its own security concerns. Specifically, an unauthorised third party with access to the partially secured data may be able to ascertain the raw attribute information for which it is not authorised by correlating their own data with the partially secured data (in other words, the third party may "reverse engineer" the raw attribute values). In order to do this, however, the third party needs to be able to apply the same cryptographic procedure to their own data as was used to partially secure the data in the first place.

This problem is overcome in the present disclosure. Specifically, the (authorised) external computing device includes a "public identifier" in the initial request, and the one or more attributes are secured using the public identifier (e.g., by using the public identifier as a key in an encryption algorithm applied to the attribute values, or by using the public identifier as a salt value in a hashing algorithm applied to the attribute values). This means that an unauthorised third party is not able to apply the same cryptographic procedure to their own data, without access to the public identifier. Additional steps, discussed in detail below, may be taken to further restrict the generation of partially secured data to ensure that only authorised parties are able to generate partially secured data in the same format (i.e., suitable for correlation).

FIG. 1 shows schematically a system 100 comprising a database network 110, a first computing device 120a and a second computing device 120b. The database network 110 comprises a plurality of databases 111 and a controller 112. The first computing device 120a and second computing device 120b are external to the database network 110. The first computing device 120a and second computing device 120b are able to communicate with one another e.g. via a computer network (not shown).

The controller 112 may be implemented using one or more processors. It is appreciated that, while not shown in FIG. 1, the controller 112 may have its own dedicated memory (data storage) for storing data, as will be discussed below. The controller 112 is operatively coupled to each of the databases 111 in the database network 110. That is, the controller 112 is able to send a request for data (queries) to the databases 111 and to receive data from the databases 111 responsive to the request.

In this example, there are three databases 111a-c, but it is appreciated that there may in practice be any number of databases 111 in the databases network 110. Moreover, the number of databases 111 in the database network 110 may change as one or more databases are added or removed from the database network 110.

The database network 110 represents a secure platform for the storage of data. In particular, one or more external entities (such as the computing devices 120) may import or upload their data to the database network 110 to be stored therein (e.g., in a respective database 111). The controller 112 may store indications of which external entities are permitted to access the various data.

Figure 2A:
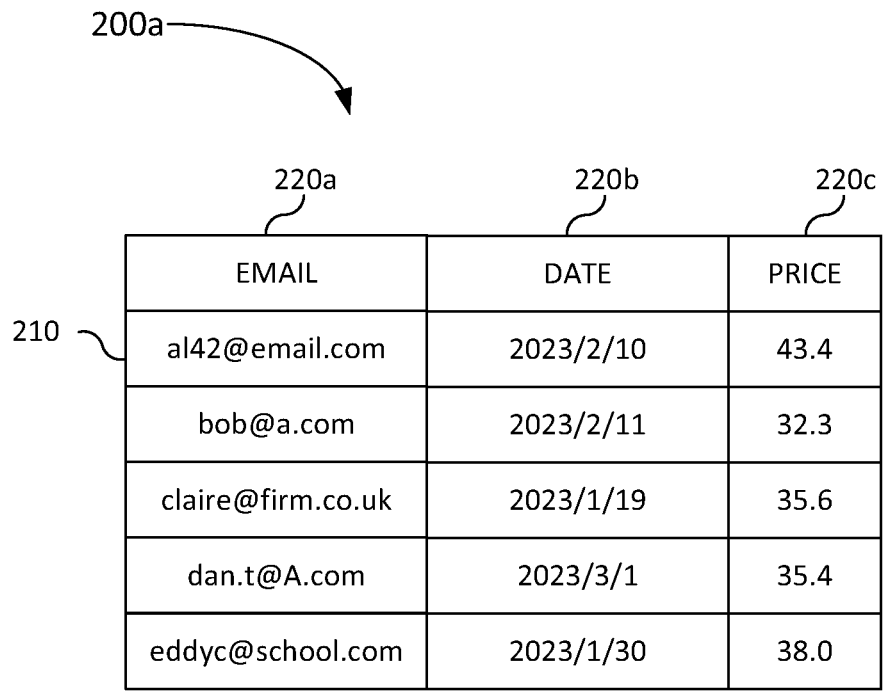
FIGS. 2a and 2b show schematically example datasets.

FIG. 2a show schematically an example of a first set of data entries 200a. The first set of data entries 200a represents an example dataset which may be stored in the first database 111a shown in FIG. 1. The first set of data entries 200a comprises a plurality of data entries 210 (five data entries 120 are shown, but it is appreciated that the first set of data entries 200a may comprise any number of data entries 210, typically many more than five). Each data entry 210 comprises a respective value for each of a plurality of attributes 220. Three attributes 220a-c are shown in FIG. 2a but it is appreciated that in general any number of attributes 220 may be represented in the set of data entries 200a.

One of more of the attributes 220 may be a "key" attribute. A key attribute is an attribute 220 which can be used to identify a particular data entry 210. That is, a key attribute is one for which the values of each data entry 210 are substantially unique. Examples of key attributes include name, email address, phone number, postcode, NHS number (e.g. in the UK), social security number (e.g. in the US), passport number, etc. Examples of non-key attributes include age, weight, year of birth, income, number of dependents, tax rate, heights. "Event" data such as number of insurance claims, visits to a local doctor, or product purchases from a website (as examples only) may also be considered non-key attributes. In FIG. 2a, the first attribute 220a ("email") is a key attribute and the second attribute 220b ("date") and third attribute 220c ("price") are non-key attributes.

Figure 2B:
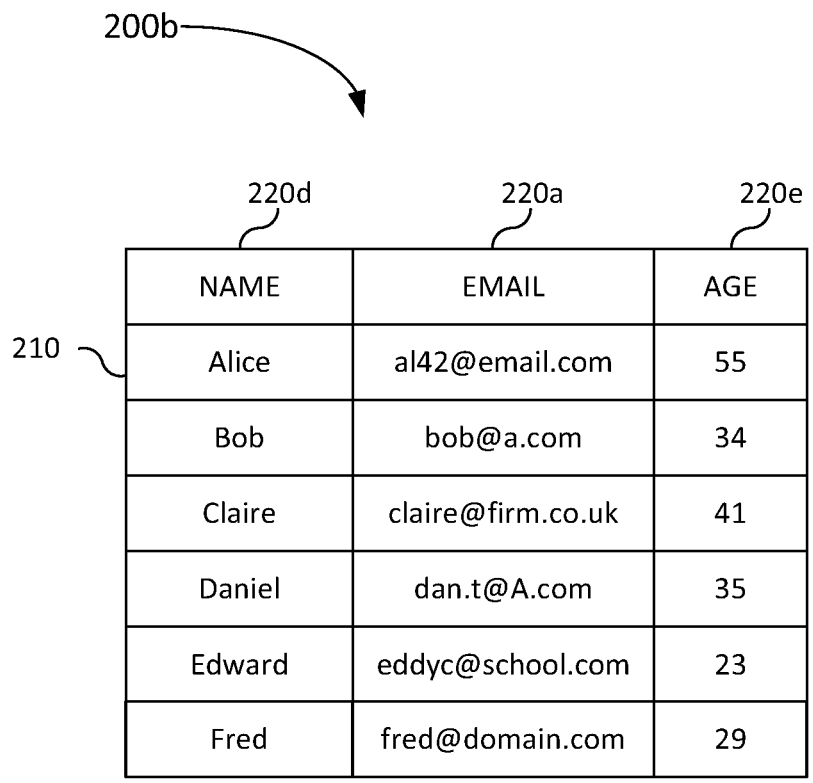

FIG. 2b shows schematically an example of a second set of data entries 200b. The second set of data entries 200 represents an example dataset which may be stored in the second database 111b shown in FIG. 1. The second dataset 200b comprises data entries 210 having the first attribute 220a, ("email") and also a fourth attribute 220d ("name") and fifth attribute 220e ("age"). The fourth attribute 220d is, in this example, a key attribute, and the fifth attribute 220e is, in this example, not a key attribute.

Note that there is overlap between the first set of data entries 200a and the second set of data entries 200b. Specifically, as identified by the key attribute "email" 220a, attributes pertaining to five people (al43@gmail.com, bob@a.com, claire@firm.co.uk, dan.t@A.com, eddyc@school.com) are present in both sets of data entries 200a, 200b. This means that the attributes for the overlapping five people found in the first set of data entries 200a (i.e. "date" 220b and "price" 220c) can be correlated with attributes for those five people found in the second set of data entries 200b (i.e. "name" 220d and "age" 220e), by matching the email addresses 220a. Attributes pertaining to a sixth person (fred@domain.com) are only found in the second set of data entries 200b and therefore no correlation is possible in this particular example.

Figure 3:
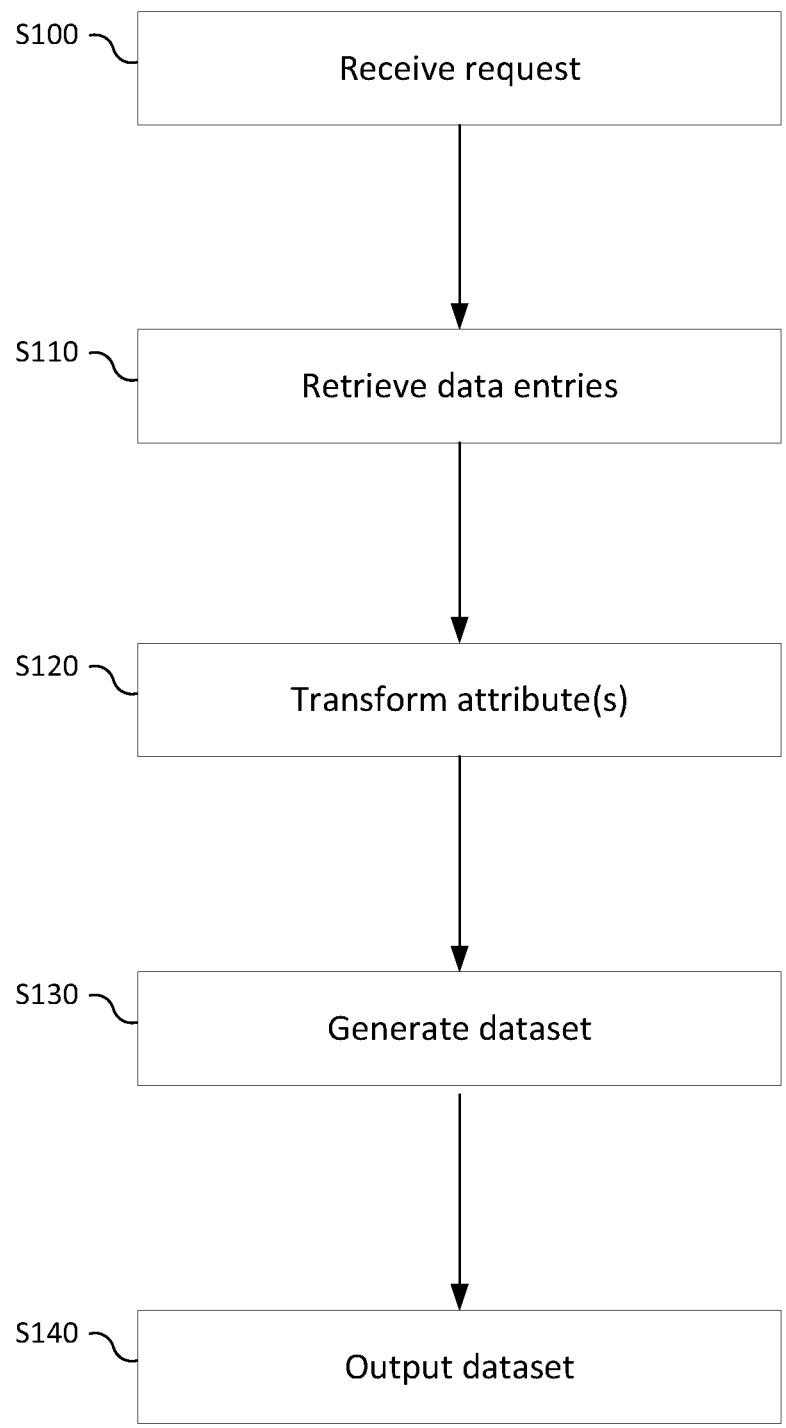
FIG. 3 is a flow diagram showing schematically a first method in accordance with examples described herein.

FIG. 3 shows schematically a flow diagram illustrating a method performed by the controller 112 according to examples described herein.

At S100, the controller 112 receives a request for a first set of data entries 200a from one of the external computing devices 120. For the purposes of illustration, it will be assumed that the first external computing device 120a provides the request. The request comprises a public identifier and an identifier of a first database 111a of the plurality of databases 111 from which the first set of data entries 200a is to be retrieved.

At S110, responsive to the request, the controller 112 retrieves the first set of data entries 200a from the first database 111a. It is appreciated that the first set of data entries 200a in general comprises any number of data entries having values for any number of attributes but, for the purposes of illustration, the first set of data entries 200a is assumed to have the form shown in the example of FIG. 2a.

At A120, the controller 112 uses the public identifier to transform the raw values of at least a first attribute 220a in the first set of data entries 200a into respective synthetic values. For the purposes of illustrating, the attribute which is transformed by the controller 112 is assumed to be the first attribute 220a from the example of FIG. 2a. In general, the controller 112 may transform any one or more of the attributes in the first set of data entries 200a. Note that in this example the attribute which is transformed (the first attribute 220a) is a key attribute (email address). In other examples, the attribute which is transformed may be a non-key attribute.

The transformation of raw values into respective synthetic values using the public identifier can be performed in various different ways. One example is to apply a hash algorithm to the raw value using the public identifier as a salt. Another example is to apply an encryption algorithm to the raw value using the public identifier as a key. The encryption algorithm may be symmetric or asymmetric, but an asymmetric encryption algorithm is preferred. This is because using a symmetric encryption algorithm means that a third party would be able to decrypt the synthetic values using the public identifier. Many examples of suitable hash algorithms and encryption algorithms are known in the art.

Figure 4A:
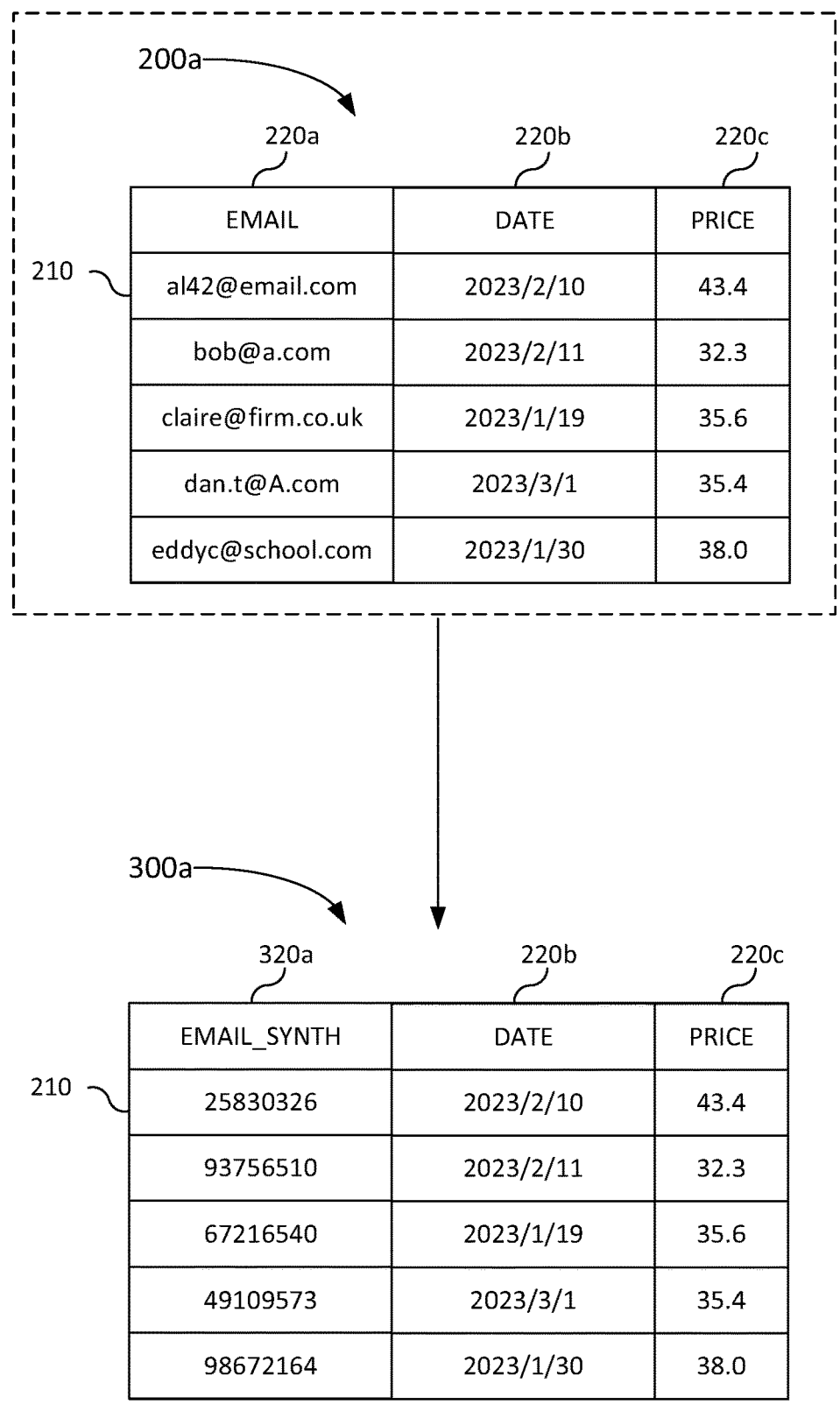
FIGS. 4a and 4b illustrate schematically examples of data securing processes which may be applied.

At S130, the controller 112 generates a first dataset 300a comprising data entries having the synthetic values for the first attribute and the raw values for at least one other attributes. An example first dataset 300a is shown in FIG. 4a. In this example, the first dataset 300a comprises data entries 210 having respective values for the synthetic attribute 320a, the second attribute 220b, and third attribute 220c.

In examples, the controller 112 may shuffle the data entries 120 of the first dataset 300a before outputting the first dataset 300a to the external computing device 120a. This can prevent the datasets 300 from being correlated by simply matching row numbers. Here, the term "shuffling" means applying a non-deterministic function to re-order the data entries of a dataset in a random manner. This means that the order of the data entries 120 of the first dataset 300a will be (almost certainly) different from the order of the data entries 120 of another dataset generated by the controller 112 (including the second dataset 300b described below).

At S140, the controller 112 outputs the first dataset 300a to at least one external computing device 120. This may include the external computing device 120 which provided the initial request (in this example, the first external computing device 120a) but could, in other examples, alternatively or additionally include a different one of the external computing devices 120. In such cases, the first external computing device 120a may include in the initial request at S100 an identifier or network address of the other external computing device 120 to which the generated first dataset 300a is to be sent. In any event, this may comprise transmitting the first dataset 300a over a computer network (not shown in FIG. 1).

Figure 4B:
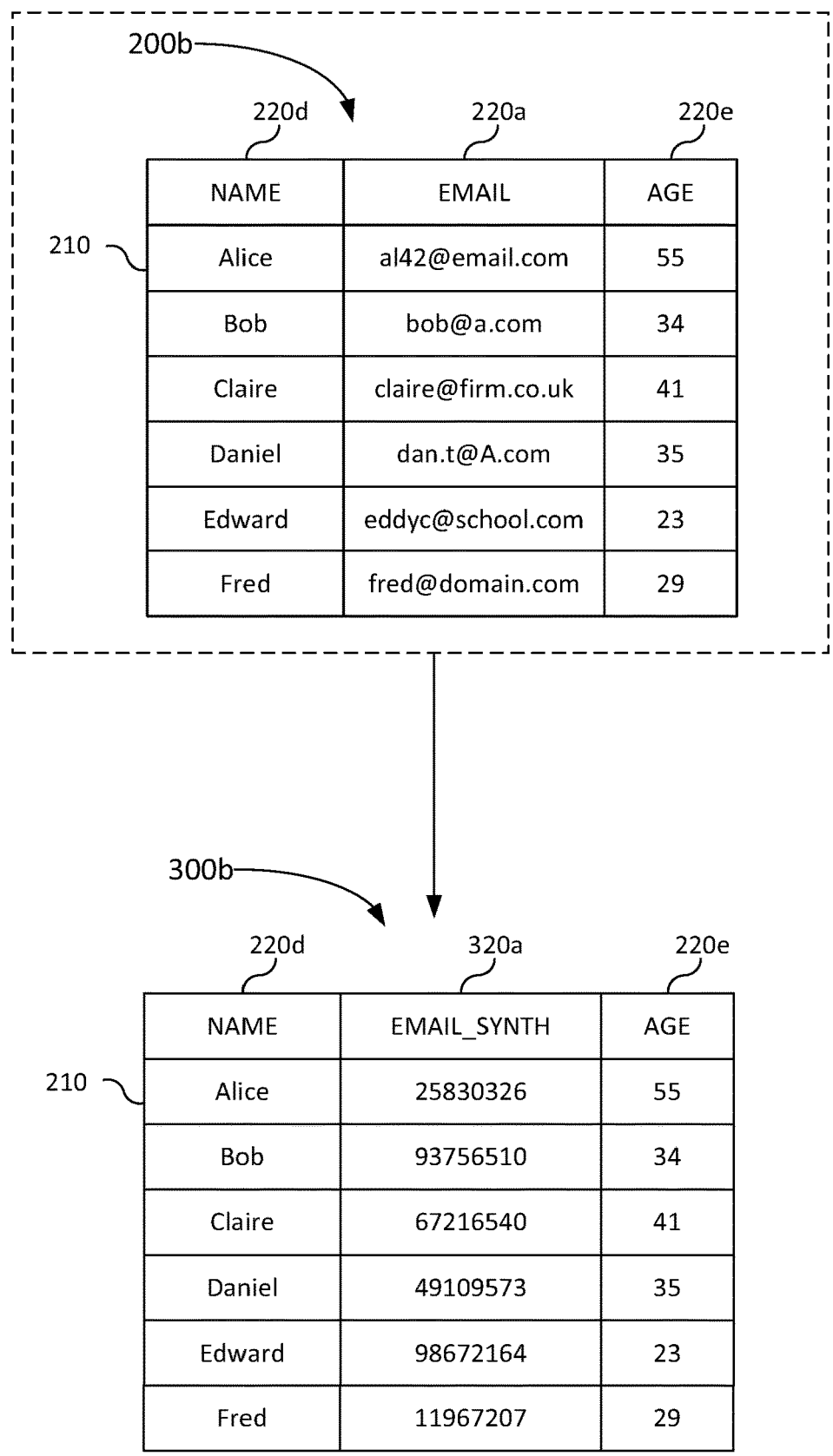

FIG. 4b shows a second dataset 300b which may be obtained by applying the method of FIG. 3 in relation to the second set of data entries 200b. In this example, it is again the first attribute 220a which is transformed into a synthetic attribute 320a. The second dataset 300b comprises data entries 210 having respective values for the synthetic attribute 320a, the fourth attribute 220d, and the fifth attribute 220e.

Because the same public identifier is used to generate the first dataset 300a and second dataset 300b, the synthetic values comprised therein can be correlated. That is, any matches between raw values are preserved in the synthetic values, while also maintaining the security of the underlying data values. In the example of FIGS. 4a and 4b, this means that the date and/or price information from the first data set 300a can be correlated with the age data from the second data set 300b (for the overlapping data entries, as discussed earlier).

Note that, in general, there may be more than two data sets 300 output from the database network 110. Moreover, these output data sets 330 may be requested by, and provided to, different external computing devices 120. Hence, the external computing devices 120 may collaborate to share the public identifier amongst themselves so that they each have access to the public identifier in order to request partially secured data from the database network 110.

In examples, the controller 112 may not use the public identifier directly to transform the raw values. Rather, the controller 112 may first combine the received public identifier with a private identifier to generate a salt value, and then use the salt value to perform the value transformations. The private identifier is stored locally by the controller 112 (at least temporarily) and only known to the controller 112. This means that none of the external computing devices 120 is able to apply the same transformation function and thereby potentially gain access to unauthorised information.

The combination of the received public identifier with the private identifier may be performed as a simple concatenation. In other examples, the combination may comprise an irreversible operation on the public identifier and private identifier. Examples of such irreversible operations include, but are not limited to, a hash of a concatenation, a bit-wise sum, a bit-wise exclusive OR, using the public identifier to encrypt the private identifier, or using the private identifier to encrypt the public identifier.

Figure 5:
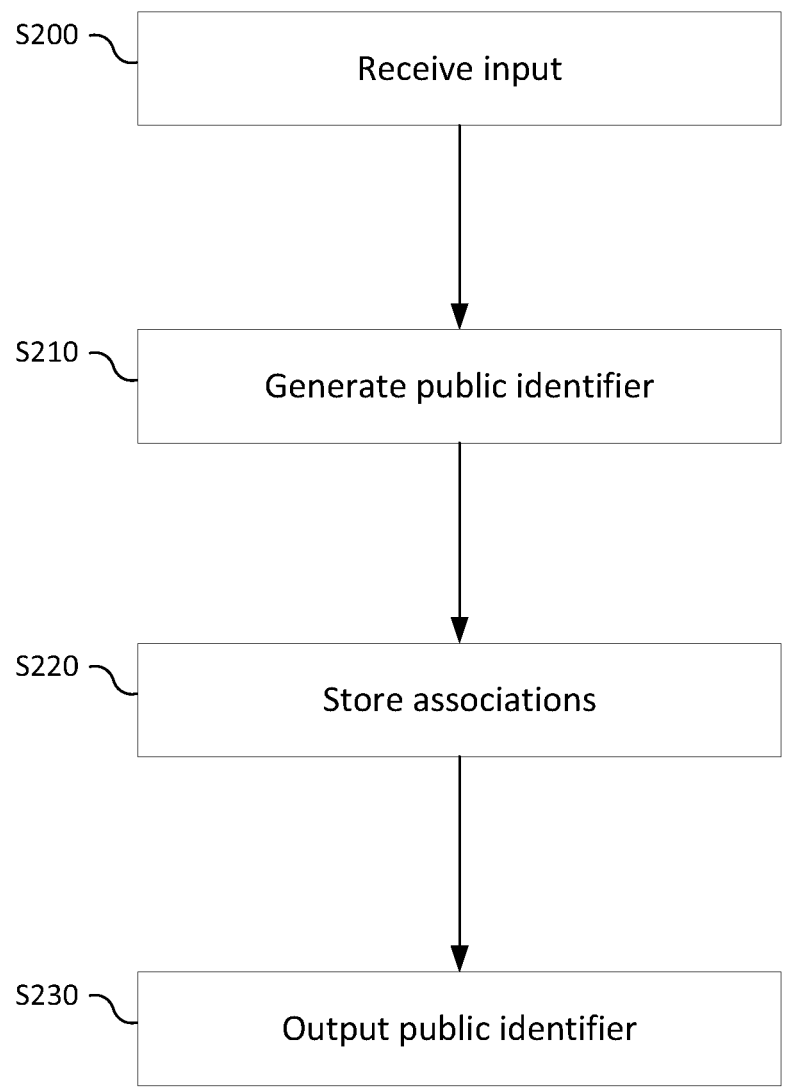
FIG. 5 is a flow diagram showing schematically a second method in accordance with examples described herein.

FIG. 5 shows a method, performed by the controller 112, of generating a data structure 400 stored locally at the controller 112. As will be described, the data structure 400 allows for one or more authentication steps to be incorporated into the data output method of FIG. 3. In this sense, the method of FIG. 5 may be considered a "set up" stage or procedure.

The owners of a plurality of external computing devices 120 may first communicate to agree on a collaboration. A collaboration specifies a plurality of databases 111 intended to be used in the data output method of FIG. 3.

At S200, the controller 112 receives an input from one of the external computing devices 120. The input comprises identifiers of the databases 111 to be used as part of the collaboration. In general, the input may specify two or more of the databases 111. For the purposes of illustration, it is assumed that the input identifies the three databases 111a-c shown in FIG. 1. Hence, the collaboration in this example, (which will be referred to as "C1") comprises all three databases 111a-c (which may be identified as "DB1", "DB2" and "DB3" respectively).

At S210, responsive to receiving the input, the controller 112 generates a public identifier for the collaboration C1.

At S220, the controller 112 generates and stores a data structure 400 for the collaboration C1. FIG. 6 shows an example of such a data structure 400. The data structure 400 associates each of the received database identifiers 410 (DB1-DB3) with an indication of the public identifier 420.

Because access to the public identifier can allow the same cryptographic procedure to be applied, it may be preferable to restrict access to the public identifier. Hence, in examples, the controller 112 may apply a hash algorithm to the public identifier to generate a hashed public identifier, and only store the hashed public identifier in the data structure 400.

As shown in FIG. 6, the data structure 400 may also associate each of the received database identifiers 410 with the private identifier 430, and/or a respective indicator 440.

The controller 112 may generate the private identifier for the collaboration C1 as part of step S210 (i.e. at the same time as generating the public identifier). The private identifier and its use are described below.

Each of the indicators 440 indicates how many times the public identifier has previously been used to generate synthetic values for data entries in the respective database associated with that indicator 440. In the example of FIG. 6, each indicator takes the form of a flag indicating whether or not the public identifier has previously been used to generate synthetic values for data entries in the respective database. The flags are initialised to "false" and, as discussed below, updated to "true" by the controller 112 in response to the controller 112 generating the synthetic values. In other examples, each indicator 440 may comprise a numerical count. The type of indicator 440 used may differ between and/or within collaborations. The indicators 440 are discussed in more detail later below.

At S230, the controller 112 outputs the public identifier to the external computing device 120. The public identifier is also shared with each of the other external computing devices. This may be done either directly by the controller 112 or by the owner of one of the external computing devices. Once output, the controller 112 may delete the public identifier from memory (and maintain only the indications, e.g., hashes, in the data structure 400).

As mentioned, the data structure 400 may be used to incorporate one or more authentication steps into the data output method of FIG. 3. That is, the controller 112 may authenticate the public identifier received as part of the request at S100 and only perform the rest of the method if the public identifier is successfully authenticated. If the controller 112 is unable to authenticate the received public identifier, it may output an error notification to the external computing device 120. If the public identifier is authenticated and, consequently, the controller 112 outputs data to the external computing device 120, then the controller 112 updates the respective indicator 440. This may comprise incrementing a count of the indicator 440, or setting the flag to "true" to indicate that the public identifier has (already) been used to generate synthetic values for data entries in the respective database.

In an example, the controller 112 may authenticate the received public identifier by determining that the public identifier was generated by the controller 112. This may comprise accessing the data structure 400 to identify a match between the received public identifier and one of the public identifiers stored in the data structure 400 (as the data structure 400 only stores public identifiers generated by the controller 112). In examples in which the controller 112 only stores hashed of the public identifiers, the controller 112 applies the same hash function to the received public identifier, and identifies a matching hash in data structure 400.

Alternatively or additionally, the controller 112 may authenticate the received public identifier by validating a digital signature or message authentication code (generated by the controller 112) received along with the public identifier in the request (S100). Systems and methods for implementing this sort of authentication are known in the art, e.g. JSON web tokens (see Request for Comments, RFC, 7518 section 3).

Alternatively or additionally, the public identifiers generated by the controller 112 may comprise an encrypted data blob of a known format e.g. Encrypt({"salt":<salt>, "controllerSecret":"my_secret_value" }). This means that, in some examples, the controller 112 can authenticate a received public identifier by applying a corresponding decryption algorithm and determining that it follows the expected format. This may comprise determining that the decrypted public identifier contains any expected secret values to further prove its authenticity.

In an example, the controller 112 may authenticate the received public identifier with respect to the database 111 which was identified in the request along with that public identifier. In other words, the controller 112 may generate public identifiers for use with specific ones of the databases 111, and only allow public identifiers to be used with respect to those one or more databases 111. For example, in contrast to the previous example, this comprises the controller 112 not only identifying a matching public identifier in the data structure 400, but the public identifier must be stored in association with an identifier of the first database.

Alternatively or additionally, the controller 112 may generate, along with the public identifiers, a signed payload containing the generated public identifier and the respective database identifier(s). In such examples, the signature can be used to authenticate the public identifier and the database association. Systems and methods for implementing this sort of authentication are known in the art.

Alternatively or additionally, the controller 112 may generate, along with the public identifiers, an encrypted payload which contains the public identifier and the database identifier(s) for which that public identifier is authenticated for use. In such examples, the controller 112 can authenticate the combination of public identifier and database identifier in the received request by decrypting the payload and comparing the received public identifier and database identifier with those as present in the decrypted payload.

In an example, the controller 112 may authenticate the received public identifier by determining that the received public identifier has not previously been used to transform raw values for data entries in the database identified in the request more than a predetermined number of times. This may be done by accessing the data structure 400 to identify whether the respective indicator 440 exceeds the predetermined number of times. In examples in which the indicators are flags, the controller 112 checks whether the respective flag is set to "false", indicating that the public identifier has not previously been used to generate synthetic values for data entries in the respective database. In this sense, the use of flags may be equivalent to the use of a numerical count insofar as the predetermined number is "1". In any event, the predetermined number represents a limit on the number of times a given public identifier can be validly used with respect to each database 111. The predetermined number may be set by the controller 112, or an external computing device 120 may specify the predetermined number in the initial input at S200 (described below).

Moreover, the controller 112 nay update: one or more of the indicators 440 periodically. This can comprise the controller 112 automatically incrementing the count (or setting the flag to "true") after a period of time, in order to indicate that the respective public identifier has expired. Alternatively or additionally, this can also comprise the controller 112 automatically decrementing the count (or setting the flag to "false") after a (possibly different) period of time. In this latter example, this can allow an external computing device 110 to generate another instance of the output using that public identifier. The controller 112 may be configured to automatically decrement the indicator 440 periodically (e.g. once a day, once a week, once a month, etc.).

The data structure 400 may store information relating to a plurality of collaborations, which may be added to and removed from the data structure 400 over time. FIG. 7 shows an example of the data structure 400*b* at a later point in time. In FIG. 7, there are three collaborations C1-C3. As described earlier, the first collaboration C1 is among databases DB1-DB3. The second collaboration is between databases DB1 and DB2, and the third collaboration is between databases DB2 and DB3.

As shown in FIG. 7, one output (from DB2) has been generated so far for the first collaboration C1; one output (from DB1) has been generated so far for the second collaboration C2; and no outputs have yet been generated for the third collaboration C3.

The controller 112 may delete a collaboration from the data structure 400 once all of the flags 440 in that collaboration are set to "true" (i.e. once all of the outputs have been generated).

As mentioned, the attribute which is transformed may be a key attribute (as in the example of FIGS. 3+5) but may equally be, in other examples, a non-key attribute. For example, consider the set of data entries in Table 1, which comprises data entries which are identified by a key attribute "email" and comprise values relating to attributes "therapeutic indication code (TIC)" and "medicinal product (MP)". Such a set of data entries may arise, for example, in a study into the effectiveness of a particular procedure or pharmaceutical.

TABLE 1

| Email | Therapeutic Indication Code (TIC) | Medicinal Product (MP) |
| --- | --- | --- |
| al42@email.com | Manual tourniquet application | Drug A |
| bob@a.com | Rest, ice, compression and elevation treatment program | Drug B |
| claire@firm.co.uk | Ultrasound treatment to knee | Drug A |
| dan.t@A.com | Rest, ice, compression and elevation treatment program | Drug B |
| eddyc@school.com | Knee exercises in water | Drug C |

Similarly to the above examples, the data in Table 1 may be "partially secured" by the controller 112 to generate a set of data entries in the form shown in Table 2.

TABLE 2

| Email | TIC_synth | MP_synth |
| --- | --- | --- |
| al42@email.com | 241736004 | 5555555555 |
| bob(@a.com | 229586001 | 6666666666 |
| claire@firm.co.uk | 304438000 | 5555555555 |
| dan.t@A.com | 229586001 | 6666666666 |
| eddyc(@school.com | 229190009 | 7777777777 |

In this example, the two non-key attributes are secured by the controller 112, and the key attribute is not secured. The data in Table 2 could be joined with other data (e.g. that shown in FIG. 2*b*) so that correlations between other attributes (e.g. age, from FIG. 2*b*) and disorder could be investigated without revealing the actual disorders the people are suffering from. This would also allow for e.g. data analysis into whether there is a bias on which medicine is prescribed for a disorder based on age It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Reference is made herein to data storage for storing data. This may be provided by a semiconductor memory, a single chip or integrated circuit or plural chips or integrated circuits, optionally provided as a chipset, or a single device or by plural devices. Suitable devices include for example a RAM, DRAM, SRAM, a hard disk and non-volatile semiconductor memory (e.g. a solid-state drive or SSD).

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A method at a controller device of a database network, the database network comprising a plurality of databases storing data entries, the method comprising:
    receiving a request for a first set of data entries, the request comprising a public identifier and an identifier of a first database of the plurality of databases from which the first set of data entries is to be retrieved;
    retrieving the first set of data entries from the first database, each data entry in the first set of data entries comprising a respective raw value for each of a plurality of attributes;
    using the public identifier to transform the raw values of at least a first attribute of the plurality of attributes into respective synthetic values;
    generating a first dataset comprising data entries having the synthetic values for the first attribute and the raw values for at least one of the attributes;

outputting the first dataset to at least one computing device external to the database network;

receiving a request for a second set of data entries, the request comprising the public identifier and an identifier of a second database of the plurality of databases from which the second set of data entries is to be retrieved;

retrieving the second set of data entries from the second database, each data entry in the second set of data entries comprising a respective raw value for each of a plurality of attributes including at least the first attribute;

using the public identifier to transform the raw values of at least the first attribute into respective synthetic values;

generating a second dataset comprising data entries having the synthetic values for the first attribute and the raw values for at least one of the attributes; and outputting the second dataset to at least one computing device external to the database network.

2. The method of claim 1, wherein using the public identifier to transform the raw values of the first attribute comprises combining the received public identifier with a private identifier to generate a salt value, and using the salt value to transform the raw values of the first attribute into respective synthetic values.

3. The method of claim 1, comprising shuffling data entries of the first dataset before outputting the first dataset to the computing device.

4. The method of claim 1, comprising authenticating the received public identifier, and only using the public identifier to transform the raw values if the received public identifier is authenticated.

5. The method of claim 4, wherein authenticating the received public identifier comprises determining that the public identifier was generated by the controller device.

6. The method of claim 4, wherein authenticating the received public identifier comprises authenticating the received public identifier with respect to the first database identified in the request.

7. The method of claim 4, wherein authenticating the received public identifier comprises determining that the public identifier has not previously been used to transform raw values for data entries in the database identified in the request more than a predetermined number of times.

8. The method of claim 1, comprising, prior to receiving said request:

receiving an input comprising an identifier of at least one of the plurality of databases;

generating a public identifier in response to receiving the input;

generating a data structure associating the received at least one database identifier with an indication of the public identifier; and outputting the public identifier to at least one computing device external to the database network.

9. The method of claim 8, comprising applying a hash algorithm to the public identifier to generate a hashed public identifier, wherein the indication of the public identifier associated in the data structure with the received at least one database identifier comprises the hashed public identifier and not the public identifier in raw form.

10. The method of claim 8, wherein the data structure comprises a respective indicator for the received at least one database identifier indicating how many times the public identifier has previously been used to generate synthetic values for data entries in the respective database.

11. The method of claim 8, comprising:

generating a private identifier in response to receiving the input; and wherein the data structure further associates the private identifier with the received at least one database identifier and the indication of the public identifier.

12. The method of claim 1, wherein the public identifier is used to transform the raw values only on condition that it is determined that:

the received public identifier was generated by the controller device;

the received public identifier is authenticated with respect to the first database identified in the request; and the public identifier has not previously been used to transform raw values for data entries in the database identified in the request more than a predetermined number of times.

13. A controller device of a database network, the database network comprising a plurality of databases storing data entries, the controller device being configured to perform the method of claim 1.

14. A non-transitory computer-readable medium comprising computer-executable instructions stored thereon configured so as when executed by one or more processors to perform the method of claim 1.

* * * * *